US005860145A

United States Patent [19]

Nogami

[11] Patent Number: 5,860,145

[45] Date of Patent: Jan. 12, 1999

[54] ADDRESS TRANSLATION DEVICE STORAGE LAST ADDRESS TRANSLATION IN REGISTER SEPARATE FROM TLB

[75] Inventor: Kazutaka Nogami, Yokohama, Japan

[73] Assignee: Kabushiki Kaisha Toshiba, Tokyo, Japan

[21] Appl. No.: 534,361

[22] Filed: Sep. 27, 1995

[30] Foreign Application Priority Data

Sep. 28, 1994 [JP] Japan .................................... 6-233687

[51] Int. Cl.[6] ........................................ G06F 12/10

[52] U.S. Cl. .................................. 711/207; 711/213

[58] Field of Search .............................. 395/403, 417; 711/207, 213

[56] References Cited

U.S. PATENT DOCUMENTS

| | | | |
|---|---|---|---|
| 4,400,774 | 8/1983 | Toy | 395/403 |
| 4,943,914 | 7/1990 | Kubo | 395/403 |
| 5,018,061 | 5/1991 | Kishigami et al. | 395/403 |
| 5,237,671 | 8/1993 | Freitas et al. | 395/417 |
| 5,526,504 | 6/1996 | Hsu et al. | 395/417 |

FOREIGN PATENT DOCUMENTS

| | | |
|---|---|---|
| 138675 | 4/1985 | European Pat. Off. . |
| 382910 A3 | 8/1990 | European Pat. Off. . |
| 492838 | 7/1992 | European Pat. Off. . |
| 4215150 | 8/1992 | Japan . |
| 4328656 | 11/1992 | Japan . |

OTHER PUBLICATIONS

European Search Report, dated Jan. 30, 1996, Appl. No. 95115267.7–2201.

J. Bradley Chen, et al., "A Simulation Based Study of TLB Performance", Computer Architecture News, 20 (1992) May, No. 2.

European Search Report, dated May 9, 1996, Appl. No. 95115267.7.

J.E. Campbell, et al., "Most Recent Class Used Search Algorithm For A Memory Cache", vol. 18, No. 10, Mar. 1976.

*Primary Examiner*—Eddie P. Chan
*Assistant Examiner*—Kevin Verbrugge
*Attorney, Agent, or Firm*—Loeb & Loeb LLP

[57] ABSTRACT

The address translation device includes a virtual page number register for storing a last-accessed virtual page number, a physical page number register for storing a physical page number corresponding to the virtual page number stored in the virtual page number and a TLB (translation lookaside buffer) circuit for storing a plurality of relationships between the physical page numbers and the virtual page numbers. First, a comparator compares a new virtual page number with an output of the virtual page number register. If the new virtual page number matches the output of the virtual page number register, the output of the physical page number register is output through a multiplexer as a physical page number. If the new and stored page numbers do not match, on the other hand, a mismatch signal output by the comparator activates the TLB circuit so that the output of the TLB circuit is outputted through a multiplexer as the physical page number. Different configurations of the TLB circuit are used in such a way that the processing speed can be secured without reducing the hit ratio of the address translation. Further, the access to the TLB circuit is minimized to reduce the power consumption.

9 Claims, 7 Drawing Sheets

2
4
VIRTUAL PAGE NUMBER REGISTER
5
PHYSICAL PAGE NUMBER REGISTER
1
TLB CIRCUIT
6
7
8
MUX
3
9

ADDRESS TRANSLATION DEVICE STORAGE LAST ADDRESS TRANSLATION IN REGISTER SEPARATE FROM TLB

FIELD OF THE INVENTION

The present invention relates to an address translation device, and more specifically to an address translation device that translates addresses at high speed with lower power consumption in a microprocessor which supports virtual storage.

BACKGROUND OF THE INVENTION

In typical microprocessors, the main storage is provided with a total translation table that identifies the correspondence between virtual addresses and physical addresses within the main storage (memory). In such a conventional microprocessor, however, a long processing time is required each time the translation table in the main storage is accessed to perform an address translation. Because a slow address translation reduces the processing speed, an address translation device such as the one shown in FIG. 6 has conventionally been provided.

In the FIG. 6 address translation device, a TLB (translation lookaside buffer) circuit 1 outputs a physical page number 3 in response to a virtual page number 2 provided to the TLB circuit 1 by the processor. TLB circuit 1 includes a correspondence table between the virtual addresses and the physical addresses, so that the physical address can be obtained from the virtual address on the basis of a table look-up operation. Most systems perform address translation by use of a TLB circuit. When address translation is not executed within a circuit such as the TLB circuit 1, the address translation table provided for the main storage is eventually accessed.

Since processing speed is lowered markedly when the address translation table of the main storage is accessed, attempts have been made to increase the probability that the address translation can be executed by the TLB circuit 1. In other words, attempts have been made to increase the hit ratio for the TLB circuit 1. For this purpose a four-way set associative type or a full associative type have been adopted as TLB circuits.

FIG. 7 is a block diagram showing a conventional address translation device of the four-way set associative type. In FIG. 7, a memory array 12 is provided with four virtual page address holding memories 10*a*, 10*b*, 10*c* and 10*d* and with four physical page address holding memories 11*a*, 11*b*, 11*c* and 11*d*. Individual ones of the virtual page address memories are interleaved with corresponding ones of the physical page address memories. When a virtual page number 2 is provided to the address translation device, the virtual page number 2 is compared with the contents of the four virtual page address holding memories 10*a*, 10*b*, 10*c* and 10*d*, respectively. If the virtual page number 2 matches the contents of one of these virtual page address holding memories 10*a*, 10*b*, 10*c* and 10*d*, the comparators 13*a*, 13*b*, 13*c* and 13*d* output a corresponding signal 14*a*, 14*b*, 14*c* or 14*d*, respectively. On the basis of the match signals 14*a*, 14*b*, 14*c* and 14*d*, a selected one of the four tri-state (three-state) buffers 15*a*, 15*b*, 15*c* and 15*d* outputs the contents of one of the four physical page address holding memories 11*a*, 11*b*, 11*c* and 11*d*, respectively as a physical page number 3.

In the conventional address translation device described above, the virtual page address 2 is compared to four addresses in parallel, allowing the hit ratio to be improved so that the processing speed is increased to the extent that the main storage is not accessed. In the conventional address translation device, on the other hand, there exists a problem of increased power consumption. In the case of the full associative type of address translation device, since the number of address comparisons executed corresponds to the number of entries in the comparison table, there exists a serious problem of increasing power consumption with increasing numbers of comparisons. Thus, if the number of corresponding address pairs within a memory array 12 is increased to increase the hit ratio, the power consumption inevitably increases due to the increased number of compare operations required to identify a hit.

SUMMARY OF THE INVENTION

In view of these problems, it is the object of the present invention to provide an address translation device which can increase processing speed without increasing power consumption and without reducing the hit ratio of the address translation circuit.

To achieve the above-mentioned object, a first aspect of the present invention provides an address translation device including a first address translation circuit having a first memory circuit for storing m-sets of corresponding relations between a virtual address and a physical address. The address translation device includes a second address translation circuit having a second memory circuit for storing a corresponding relation between a virtual address and a physical address, with a most recent virtual address and a physical address corresponding to the most recent virtual address being stored therein. The virtual address stored within the second address translation circuit is updated whenever the first address translation circuit executes a translation. A comparing means within the address translation device includes a comparator for comparing a new virtual address to be translated with a virtual address stored in the second address translation circuit. When the new virtual address matches the address stored in the second address translation circuit, the new virtual address is translated into a physical address and is output by said second address translation circuit without activating the first address translation circuit. When the new virtual address does not match the address stored in the second address translation circuit, the new virtual address is translated into a physical address by activating the first address translation circuit.

In accordance with a second aspect, the present invention provides an address translation device of the set associative type comprising address translating means having a plurality of ways for storing a corresponding relationship between a virtual address and a physical address. A control means has a control circuit for storing a preceding way most recently hit or entry-registered. A comparing means has a plurality of comparators each corresponding to each of the ways. Each of the comparators compares a virtual address to be translated with a virtual address stored in one of the ways and outputs a match signal or a mismatch signal as the result of the comparison. The control means activates the comparator corresponding to the preceding way. When the comparator outputs a match signal, a physical address of the preceding way is output, and when the comparator outputs a mismatch signal, one or more of the comparators corresponding to the other ways are activated. A physical address is output from a corresponding way when the comparator outputs a match signal.

In accordance with a further aspect of the first aspect of the second aspect of the present invention, whenever a virtual address to be translated is given, the virtual address to be translated is compared with the virtual address of the second address translating means. If the address translation can be made in this manner, the physical address is output by the second address translating means without activating the first address translating means. On the other hand, however, when the address translation cannot be made by the second address translating means, the first address translating means is activated to output the physical address. Consequently, it is possible to reduce the power consumption due to the activation of the first address translating means.

In accordance with a further aspect of the present invention, a plurality of the ways of the address translating means are selectively accessed on the basis of the most recent address translations to retrieve the physical address corresponding to the virtual address to be translated. As a result, it is possible to reduce power consumption as compared with the case where the entire address translating means is accessed.

DETAILED DESCRIPTION OF THE EMBODIMENTS

The embodiments of the present invention will be described in detail hereinbelow with reference to the attached drawings.

Often, in typical processors using address translation, the address translation is executed in such a way that a virtual page or other virtual pages in the vicinity thereof are translated several times in succession. After such repeated accesses, then virtual paces having addresses remote from the recently translated pages might be translated. In other words, the same virtual page may often be repeatedly translated before other pages are translated. The inventors have recognized this fact, which has previously not been noticed, and have made the present invention accordingly. In accordance with preferred embodiments of the present invention, at least the most recently translated virtual page is first stored. The stored virtual page is compared with the new virtual page to be translated next. When both the most recent, stored virtual address and the new virtual addresses match, the virtual address is immediately translated to a physical address without accessing the TLB (translation lookaside buffer) circuit. Not accessing the TLB saves power in comparison to address translations in which the TLB circuit is accessed. In the case of the address translation device according to the present invention, it is possible to reduce the power consumed in an address translation device as compared to the conventional address translation device.

First Embodiment—A Full Associative TLB Circuit

Figure 1:
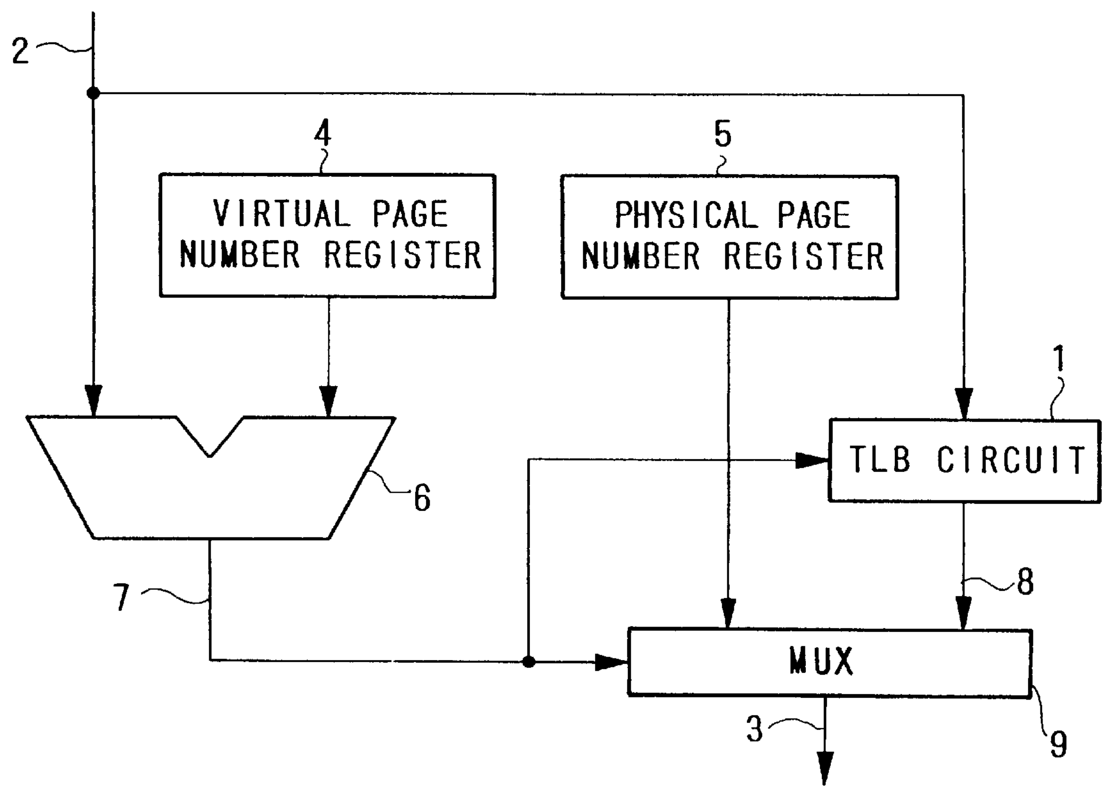
FIG. 1 is a block diagram showing a first embodiment of the address translation device according to the present invention.

FIG. 1 is a block diagram showing a first embodiment of an address translation device according to the present invention. As shown, the address translation device comprises a virtual page number register 4 for storing a virtual page number whose address has been translated most recently, and a physical page number register 5 for storing the physical page number whose address has been translated most recently. A virtual page number 2 is provided to both a TLB circuit 1 and a comparator 6. An output of the virtual page number register 4 is also provided to the comparator 6. The comparator 6 compares the virtual page number 2 with the contents stored in the virtual page number register 4. When the virtual page number 2 does not match the output of the virtual page number register 4, the comparator 6 outputs a mismatch signal 7. In response to the mismatch signal 7 from the comparator 6, the TLB circuit 1 is activated to execute the address translation of the virtual page number 2 for outputting the corresponding physical page number 8. Further, a multiplexer 9 selects either the output of the physical page number register 5 or the output of the TLB circuit on the basis of the mismatch signal 7, outputting the selected output as the physical page number 3.

The operation of the device constructed as described above is described hereinbelow in further detail.

Whenever it is necessary to translate the address of the current virtual page number 2, the current virtual page number 2 to be address-translated is compared by comparator 6 with the preceding virtual page number whose address has been translated most recently and stored in the virtual page number register 4. No mismatch signal 7 is output from the comparator 6 when the current and preceding virtual page numbers match, so that multiplexer 9 outputs the physical page number from register 5. As a result, the content of the physical page number register 5 is output as the physical page number 3. Since no mismatch signal 7 is output from the comparator 6, the TLB circuit 1 (activated in response to mismatch signal 7) remains deactivated.

If, on the other hand, the current and preceding virtual page numbers do not match, a mismatch signal 7 is output from the comparator 6, and mismatch signal 7 activates the TLB circuit 1. As a result, the TLB circuit 1 accesses the correspondence table to address-translate the current virtual page number 2, and to output the physical page number 8 corresponding thereto. Because the multiplexer 9 selects the output of the physical page number register 8 in response to the mismatch signal 7, the TLB circuit 1 outputs the physical page number 8 as the physical page number 3.

According to the first embodiment, whenever the virtual page number 2 matches the preceding virtual page number most recently address-translated and stored in the virtual page number register 4, the physical page number 3 is directly obtained from the physical page number register 5 without activating the TLB circuit 1. As such, it is possible to save the power which would be otherwise consumed if the TLB circuit 1 were activated. Further, the higher the hit ratio of the virtual page number 2 to be address-translated to that stored in the virtual page number register 4, the more effective the above-described power saving strategy becomes.

Figure 4:
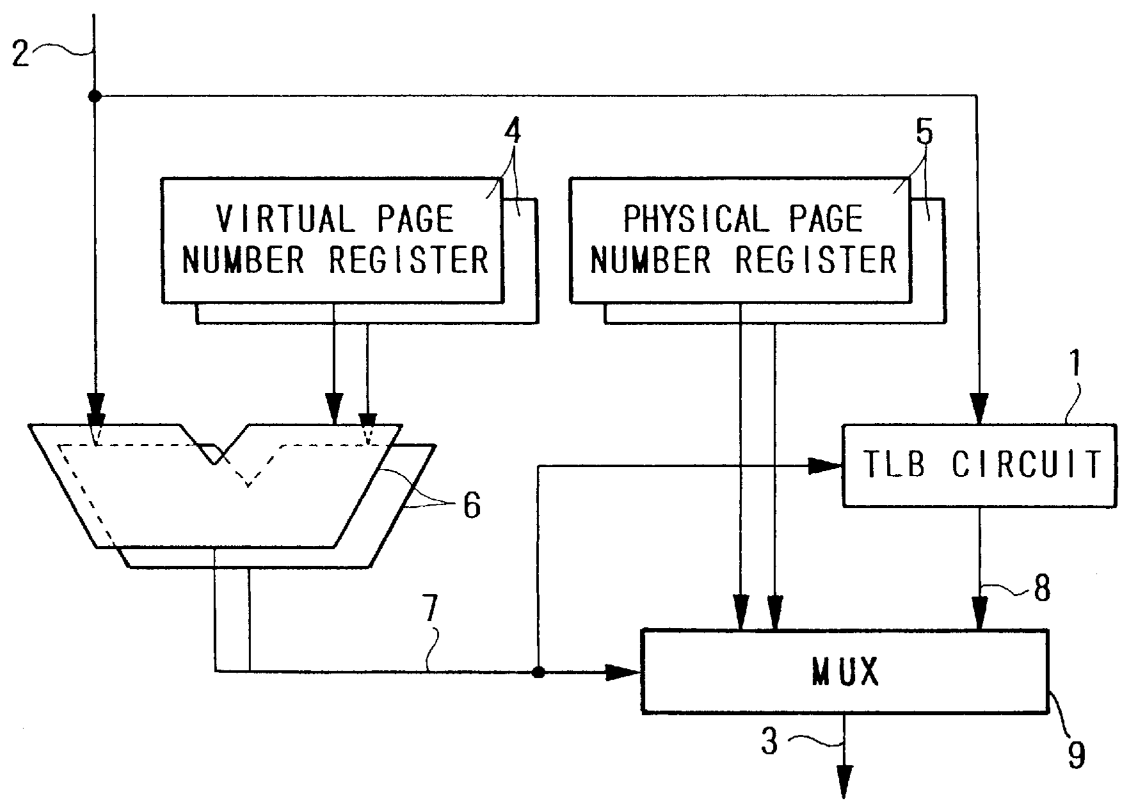
FIG. 4 is a block diagram showing a modification of the first embodiment of the address translation device according to the present invention.

In the preceding description of the first embodiment, only one system composed of the virtual page number register 4, the physical page number register 5 and the comparator 6 is shown. It is also possible to construct an address translation device in accordance with the first embodiment in such a way that a plurality of virtual page addresses and a plurality of corresponding physical addresses can be stored, where the data sets of virtual page numbers and physical addresses correspond to the "n" most recent address translations. FIG. 4 shows an example of this sort of modification of the first embodiment, in which the virtual page numbers used for the two most recent address translations can be compared with the newly requested virtual page number.

Figure 5:
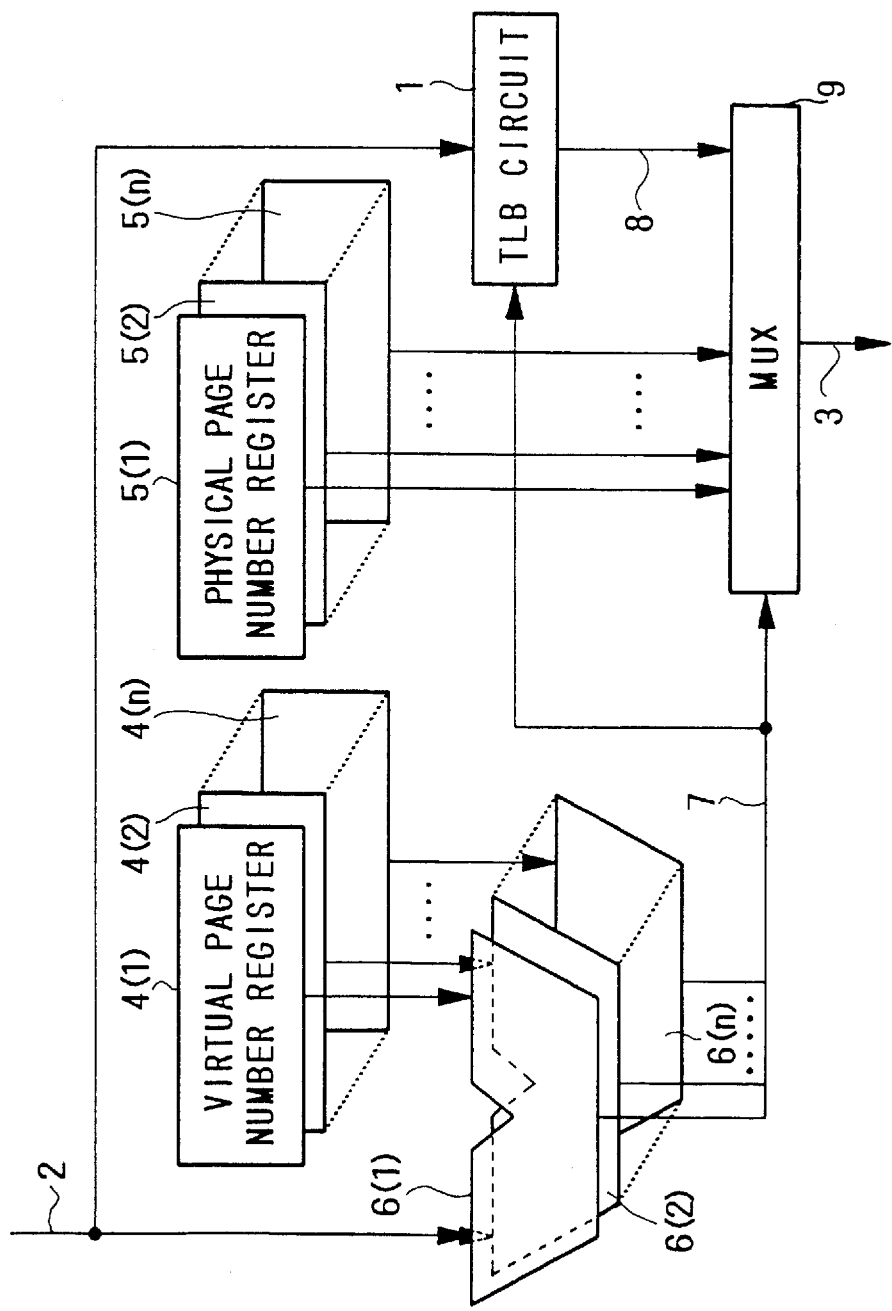
FIG. 5 is a block diagram showing another modification of the first embodiment the address translation device according to the present invention.
Figure 6:
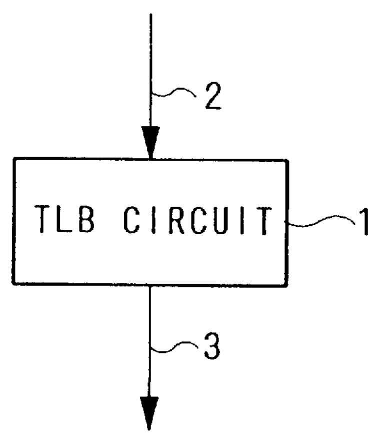
FIG. 6 is a block diagram showing a general TLB circuit.

FIG. 5 shows a further modification of the first embodiment, in which the device comprises n-units of registers 4(1) to 4(*n*) and n-units of registers 5(1) to 5(*n*), respectively. In this modification, the virtual page numbers used for address translations from the most recent to the n-th most recently translated virtual page number can be compared with the current virtual page number.

During address translation in the modification as shown in FIG. 4, whenever a new virtual page number 2 is given, the new virtual page number 2 is compared with a plurality (two) of the virtual page numbers 2 stored in a plurality (two) of virtual page number registers 4. When the current virtual page number 2 matches any one of the plurality of the virtual page numbers stored previously, the physical page number 3 is obtained from any of a plurality (two) of physical page number registers 5 without activating the TLB circuit 1. Further, only when the current virtual page number 2 does not match any of the most recent virtual page numbers, the TLB circuit 1 is activated.

In the modification described above, since the hit ratio of the current virtual page number to any one of those stored in the virtual page number registers 4 is further increased, the activation rate of the TLB circuit 1 is further reduced, so that the power consumption can be further reduced. With respect to power consumption, since the number of comparators 6 is smaller than the number of comparators included in the TLB circuit 1, an increase in power consumption due to an increase in the number of the comparators 6 is smaller than an increase in the power consumption due to the activation of the TLB circuit 1.

The construction shown in FIGS. 1, 4 and 5 can be effectively applied to the full associative type TLB circuit.

Second Embodiment—A Set Associative TLB Circuit

Figure 2:
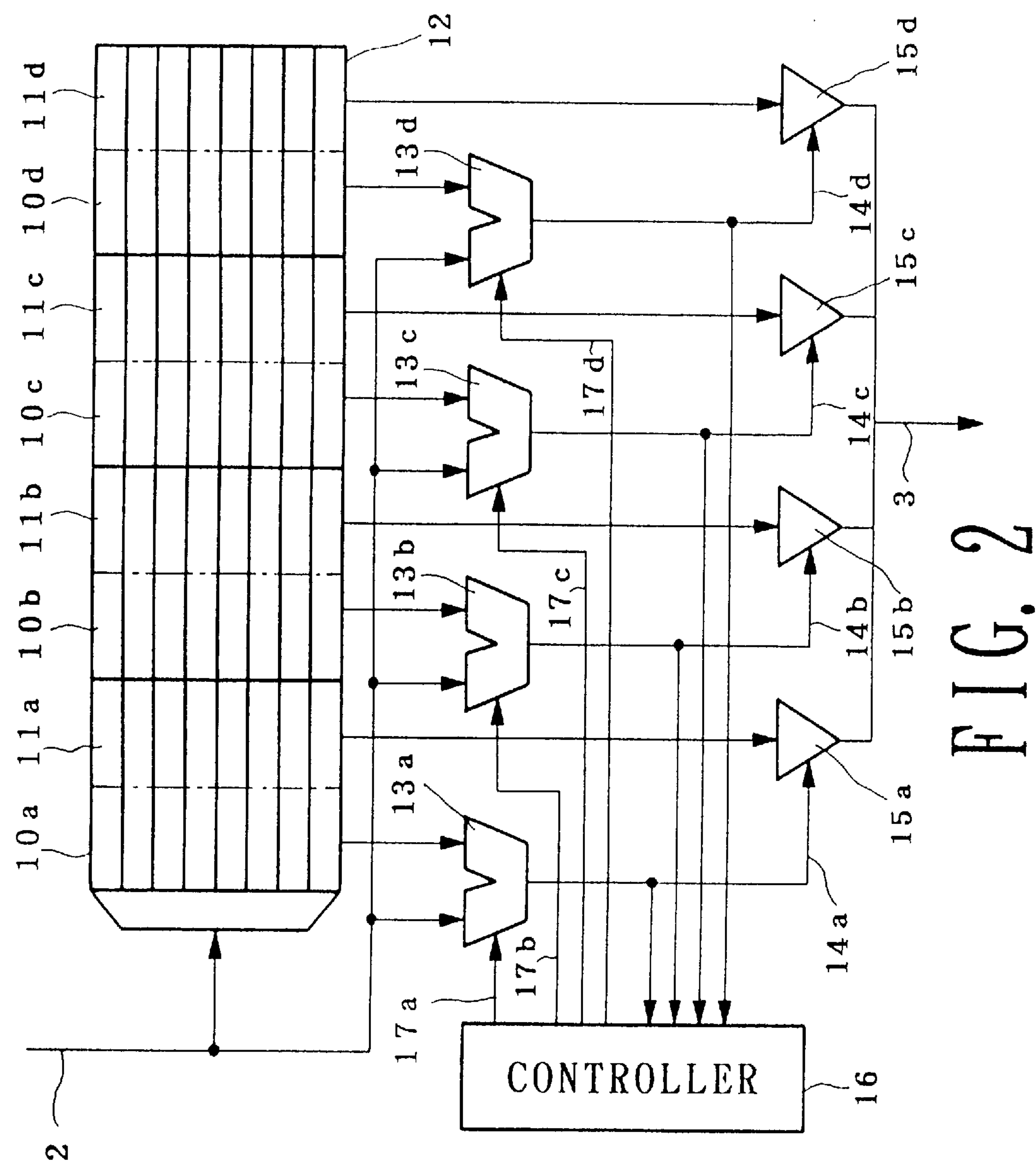
FIG. 2 is a block diagram showing a second embodiment of the address translation device according to the present invention.

FIG. 2 is a block diagram showing a second embodiment of an address translation device according to the present invention. The FIG. 9 embodiment illustrates an aspect of the present invention applied to a TLB circuit of the four-way set associative type. The memory array 12 of the FIG. 2 TLB circuit accommodates a four-way set associative mapping because four sets of virtual address-physical address relationships can be stored therein. For the purposes of the following discussion, one "way" consists of a pair of memories (e.g., 10*a* and 11*a*) which are capable of storing a relationship, such as the relationship between a virtual page address and a physical page address. Thus, since there are four memory register pairs capable of storing relationships within the memory array 12 of FIG. 2, the FIG. 2 TLB circuit can be used for a four-way set associative TLB circuit.

In memory array 12 of FIG. 2, there are arranged four systems of virtual page address holding memories 10*a*, 10*b*, 10*c* and 10*d* and physical page address holding memories 11*a*, 11*b*, 11*c* and 11*d* in corresponding relationship to each other. When a virtual page number 2 is provided to the memory array 12, four comparators 13*a*, 13*b*, 13*c* and 13*d* compare the new virtual page number 2 with the four outputs of the virtual page address holding memories 10*a*, 10*b*, 10*c* and 10*d*. When the new virtual page number 2 matches the contents of the memories 10*a*, 10*b*, 10*c* or 10*d*, the corresponding comparator 13*a*, 13*b*, 13*c* or 13*d* outputs a match signal 14*a*, 14*b*, 14*c* or 14*d*. The match signals 14*a*, 14*b*, 14*c* or 14*d* are provided to a corresponding one of the tri-state buffers 15*a*, 15*b*, 15*c* or 15*d*, which buffer provides the output of the corresponding physical page address holding memory 11*a*, 11*b*, 11*c* or 11*d* as the physical page number 3. Each of the match signals 14*a*, 14*b*, 14*c* or 14*d* from comparators 13*a*, 13*b*, 13*c* or 13*d* is provided to a controller 16. On the basis of the match signals 14*a*, 14*b*, 14*c* or 14*d*, the controller 16 outputs an activation signal 17*a*, 17*b*, 17*c* or 17*d* to the corresponding comparator 13*a*, 13*b*, 13*c* or 13*d* to control the activation of the comparators 13*a*, 13*b*, 13*c* or 13*d*.

The operation of the address translation device so constructed will now be described.

When it becomes necessary to translate the address of the virtual page number 2, the controller 16 first outputs the activation signal 17*a*, 17*b*, 17*c* or 17*d* to the comparator 13*a*, 13*b*, 13*c* or 13*d* corresponding to the "way" (i.e., the memory pair 10*i*, 11*i*) of the way in which the last-hit address and/or the entry registered address is stored. Therefore, the corresponding comparator 13*a*, 13*b*, 13*c* or 13*d* selected by the controller 16 compares the virtual page number 2 with the output of the virtual page address holding memory 10*a*, 10*b*, 10*c* or 10*d* corresponding to the selected comparator 13*a*, 13*b*, 13*c* or 13*d*.

As a result of the comparison, when the virtual page number "hits" (i.e., matches with) the content of the holding memory 10*a*, 10*b*, 10*c* or 10*d*, the corresponding comparator 13*a*, 13*b*, 13*c* or 13*d* outputs the match signal 14*a*, 14*b*, 14*c* or 14*d* so that the output of the physical page address holding memory 11*a*, 11*b*, 11*c* or 11*d* is output through the corresponding tristate buffer 15*a*, 15*b*, 15*c* or 15*d* as the physical pace number 3. Further, when the virtual page number 2 does not hit the virtual page number stored in the memory 10*a*, 10*b*, 10*c* or 10*d*, the controller 16 outputs another activation signal 17*a*, 17*b*, 17*c* or 17*d* to the comparators 13*a*, 13*b*, 13*c* or 13*d*, activating the next sequential comparator 13*a*, 13*b*, 13*c* or 13*d*. As a result of the next comparison, if the virtual page number hits the output of the holding memory 10*a*, 10*b*, 10*c* or 10*d*, the corresponding comparator 13*a*, 13*b*, 13*c* or 13*d* outputs the match signal 14*a*, 14*b*, 14*c* or 14*d* so that the output of the physical page address holding memory 11*a*, 11*b*, 11*c* or 11*d* is output through the corresponding tri-state buffer 15*a*, 15*b*, 15*c* or 15*d* as the physical page number 3.

Figure 7:
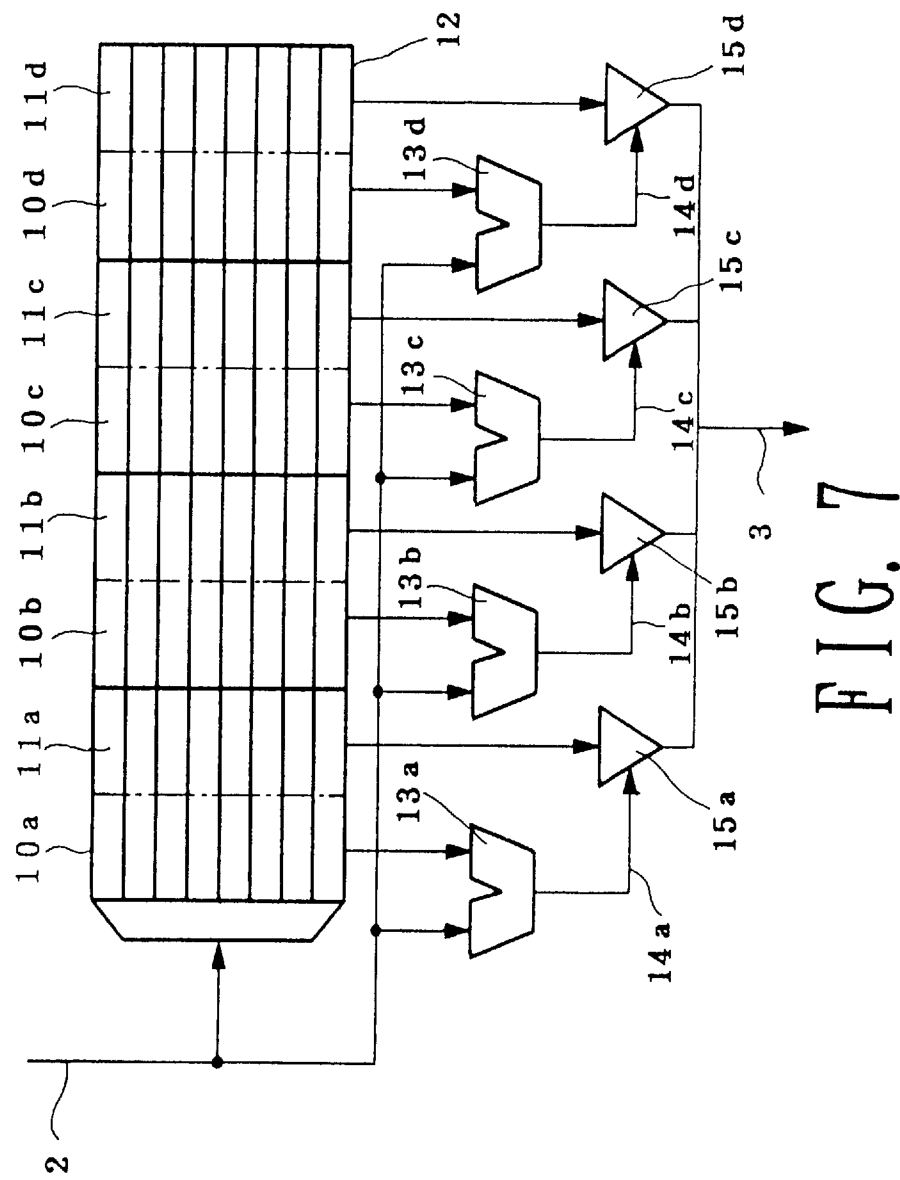
FIG. 7 is a block diagram showing a prior art address translation device.

Further, although the four-way construction of the second embodiment has been shown by way of example, the address translation device of this second embodiment can be adopted for an arbitrary number of ways (or memory pairs). In addition, in the second embodiment, since the translation device can be obtained by simply adding only the controller 16 to the conventional circuit device (such as that illustrated in FIG. 7), it is possible to reduce the overhead (the total cost) of the device. Furthermore, the address translation device according to the second embodiment need not be provided with comparators and so on which are provided in the device according to the first embodiment. The second embodiment is particularly preferred for use with the set associative type TLB circuit.

Third Embodiment—A Hybrid TLB Circuit

Figure 3:
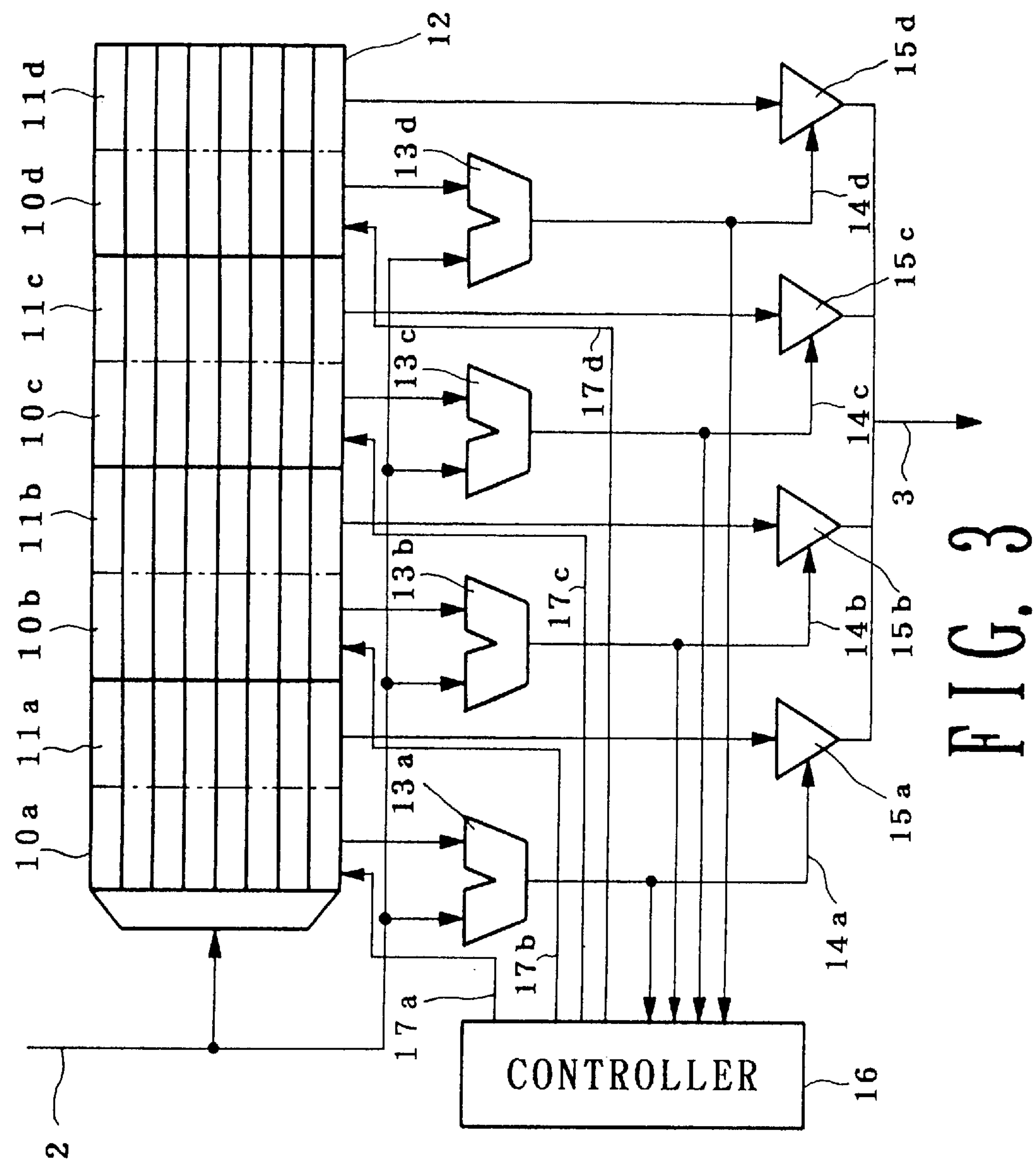
FIG. 3 is a block diagram showing a third embodiment of the address translation device according to the present invention.

A third embodiment of the address translation device according to the present invention is shown in FIG. 3 and will now be described. In this third embodiment, aspects of the first embodiment are applied to the construction of the second embodiment. More particularly, in the second embodiment the control circuit 16 controls only the activation of the comparators 13*a*, 13*b*, 13*c* or 13*d*. In this third embodiment, instead of controlling the comparators 13, the controller 16 controls the activation of the respective ways (memory pairs) within the memory array 12 on the basis of the activation signals 19*a* to 19*d*.

In the configuration illustrated in FIG. 3, the controller can execute a memory access and hit check for the way of the last-hit or last-entry registration. When there is a hit, the controller provides the output of the physical page address holding memory 11*a*, 11*b*, 11*c* or 11*d* of the hit way, as the physical page number 3. In the case that there is no hit, on the other hand, the controller executes the memory access to another one of the ways, and the TLB of FIG. 3 performs another comparison or hit check. The operation of the FIG. 3 TLB circuit is thus similar to that of the FIG. 5 TLB circuit (described with respect to the first embodiment), with the exception that in the FIG. 3 circuit, only one register pair and one comparator are active at any given time. By contrast, all of the register pairs and all of the comparators are simultaneously active in the FIG. 5 circuit. Thus, the FIG. 5 circuit offers faster access speeds at the cost of higher power consumption.

In this third embodiment, since the virtual page address holding memories 10*a*, 10*b*, 10*c*and 10*d* and the physical page address holding memories 11*a*, 11*b*, 11*c* and 11*d* are activated only when the corresponding way of the memory array 12 is accessed, it is possible to minimize the number of activated memory cells of the memory array 12, with the result that the power consumption can be minimized.

In the embodiments described above, address translation is executed by suppressing the activation of the entire TLB circuit. By taking advantage of the fact that the probability is very high that the last-hit address or the entry registered address will be the next address translated, it is possible to reduce the power consumed due to activation of the TLB circuit, while maintaining the number of entries and ways the same as that of the ordinary TLB circuit; in other words, without reducing the hit ratio.

I claim:

1. An address translation device comprising:

a first address translation circuit having a first memory circuit for storing m sets of corresponding relations between a virtual address and a physical address and translating the virtual address into the corresponding physical address;

a second address translation circuit having a second memory circuit for storing a corresponding relation between a virtual address and a physical address and translating the virtual address into the corresponding physical address, a most recent virtual address and a physical address corresponding to the most recent virtual address being stored therein, the virtual address stored therein being updated whenever said first address translation circuit executes a translation;

comparing means having a comparator for comparing a new virtual address to be translated with a virtual address stored in said second address translation circuit, wherein when the new virtual address matches the virtual address stored in the second address translation circuit, the new virtual address is translated into a physical address and output by said second address translation circuit without activating said first address translation circuit, and when the new virtual address does not match the virtual address stored in the second address translation circuit, the new virtual address is translated into a physical address by activating said first address translation circuit; and a multiplexer having a first input coupled to receive a translated physical address output by said second address translation circuit and a second input coupled to receive a translated physical address output by said first address translation circuit when said first address translation circuit is activated, wherein said multiplexer outputs the translated physical address from said first input when said comparing means outputs a match signal, and said multiplexer outputs the translated physical address from said second input when said comparing means outputs a mismatch signal.

2. The address translation device of claim 1, wherein said second address translation circuit has n second storing circuits for storing n sets of corresponding relations between a virtual address and a physical address from the most recent to an n-th from the most recent, respectively, and said comparing means has n comparators, each corresponding to one of said second storing circuits and comparing the new virtual address with a virtual address stored in said corresponding second storing circuit.

3. The address translation device of claim 2, where n is 1.

4. The address translation device of claim 2, where n is 2.

5. The address translation device of claim 2, wherein m is larger than n.

6. The address translation device of claim 2, wherein the n sets of corresponding relations between the virtual address and the physical address stored in said second address translation circuit are also stored in said first address translation circuit.

7. The address translation device of claim 1, wherein said first address translation circuit is of full associative type.

8. The address translation device of claim 2, wherein said first address translation circuit is of full associative type.

9. An address translation device comprising:

a first address translation circuit having a first memory circuit for storing m sets of corresponding relations between a virtual address and a physical address and translating the virtual address into the corresponding physical address;

a second address translation circuit having a second memory circuit for storing n sets of corresponding relations between a virtual address and a physical address from the most recent to an n-th from the most recent, respectively, the second address translation circuit translating the virtual address into the corresponding physical address, a most recent virtual address and a physical address corresponding to the most recent virtual address being stored therein, the virtual address stored therein being updated whenever said first address translation circuit executes a translation;

comparing means having n comparators, each corresponding to one of said second storing circuits for comparing the new virtual address to be translated with a virtual address stored in said corresponding second storing circuit, wherein when the new virtual address matches the virtual address stored in the second address translation circuit, the new virtual address is translated into a physical address and output by said second address translation circuit without activating said first address translation circuit, and when the new virtual address does not match the virtual address stored in the second address translation circuit, the new virtual address is translated into a physical address by activating said first address translation circuit; and a multiplexer having a plurality of first inputs coupled to receive translated physical addresses output by the second storing circuits of said second address translation circuit, and having a second input coupled to receive a translated physical address output by said first address translation circuit when said first address translation circuit is activated, wherein said multiplexer outputs the translated physical address from the first input corresponding to one of the comparators when the one comparator outputs a match signal, and said multiplexer outputs the translated physical address from said second input when said comparing means outputs a mismatch signal.

* * * * *